Patented July 31, 1934

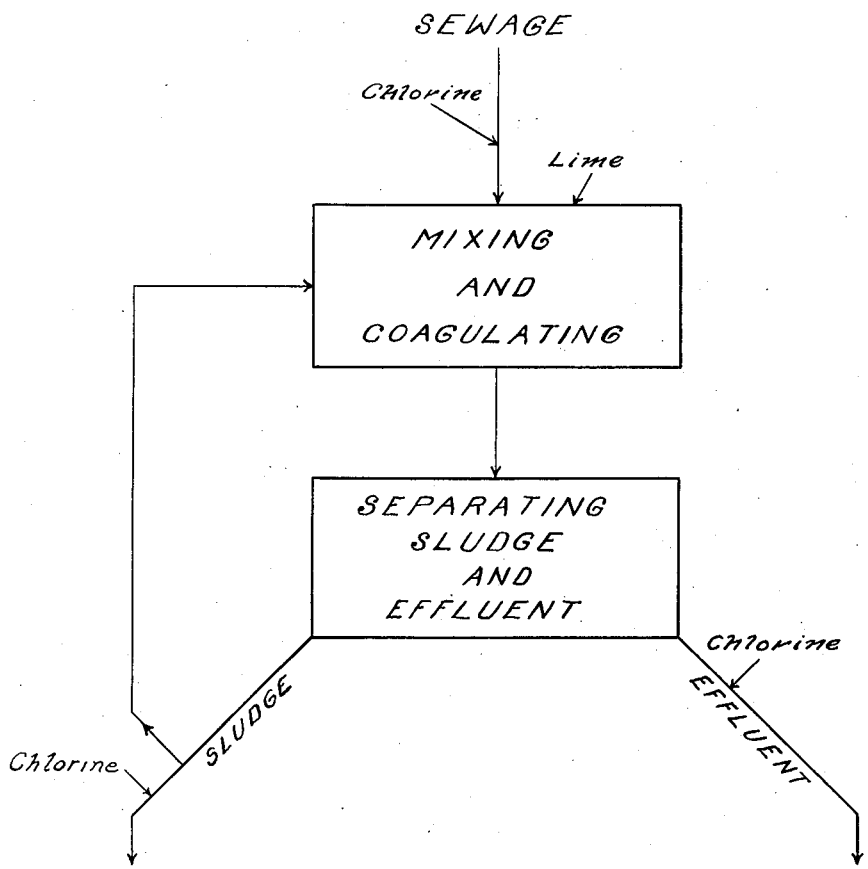

1,968,114

UNITED STATES PATENT OFFICE 1,968,114

TREATMENT OF SEWAGE AND THE LIKE

Clifton N. Windecker, Painesville, Ohio

Application July 26, 1932, Serial No. 624,874

6 Claims. (Cl. 210—28)

This invention relates to the treatment of sewage and other wastes, and more particularly the treatment of such material to eliminate polution-prepensities otherwise inherent. Among the objects of the invention is the provision of a procedure initially reducing disagreeable odors during treatment, and accordingly making it possible to carry on the process adjacent to populous districts without nuisance. Another object is the provision of treatment free from undue complications and capable of yielding a sterile effluent and a sterile sludge easy to handle. A further object is the conversion of the sludge into useful forms of merchantable products, if desired. Other objects and advantages will appear as the description proceeds.

To the accomplishment of the foregoing and related ends, the invention, then, comprises the features hereinafter fully described, and particularly pointed out in the claims, the following description and the annexed drawing setting forth in detail an illustrative embodiment of the invention, this being indicative however, of but one of the various ways in which the principle of the invention may be employed.

In said annexed drawing:

The sole figure is a diagrammatic showing, on the order of a flow-sheet, illustrating one form of the invention.

To the sewage or the like, if initially of odorous character, there is preferably added an agent to reduce disagreeable odors during the treatment. For this, a suitable agent, for instance chlorine, this being efficient and inexpensive, is added to the sewage, on or before entrance to the disposal plant. Such chlorine introduced in convenient or preferred form, is in amount which need not be sufficient to effect complete sterilization, but may be in relatively small proportion, depending upon the particular needs, for instance 10 or more parts per million of chlorine. This slightly chlorinated sewage is introduced into a tank or gallery sufficiently large to hold an amount of 10 to 20 minutes normal flow. In this tank or gallery gentle agitation is effected by suitable means, for example baffles to churn the flow, or a slow stirring device.

To the contents of the tank or gallery lime is added, in such manner as to thoroughly permeate the mass before overflowing or leaving the tank or gallery. The amount of lime added is sufficient to promote flocculation to carry down as sludge all the settable matter, the lime acting with the calcium bicarbonate and magnesium compounds occurring in natural waters. This settable material in the sewage mass is then allowed to settle in a tank or basin large enough to give time for settling to clarity, or at least sufficiently so that the matter can be filtered through sand beds, or by means of suitable mechanical filters. The effluent may then be lead through a tank or gallery where complete sterilization may be assured by the addition of more chlorine, the amount required being determined by suitable means, for instance the bio-chemical oxygen requirement. After this, the effluent can be run with safety into streams or lakes.

By providing in the settling tank before-mentioned, a slow moving mechanism to gradually forward the sludge to a desired outlet, it can thence be pumped continuously or intermittently in the desired concentrated form. A portion of the sludge is desirably returned into admixture with the in-coming sewage or the like to assist in settling. That portion of the sludge necessary for final disposal is chlorinated to complete sterilization and can then be de-watered by mechanical means, such as rotary vacuum filters, or it may be conducted to sand beds where it will readily drain. The solid waste so formed is now in a stable innocuous condition, and may be disposed of in any desired way. By reason of its characteristics, it may be dried sufficiently to allow of incinerating if preferred. In some instances also, the amount of cellulosic fibre runs so high that the pulp may be suitably sheeted in the manner of paper-making, and a product of various applicability, as packing, and other forms of paper, may be obtained.

The character of the material to be treated, necessarily being variable from different localities from day to day, and even during different hours of the day, as varied for instance by particular trade wastes, storms, wash-days etc., the amounts of lime and of the chlorine to be used in the effluent and the final treatment of the sludge should be determined by sampling at suitable intervals. In some localities where the water is primarily very pure and relatively free from calcium and magnesium salts, or for other reasons, proper flocculation for settling of the raw sewage may be promoted by addition of such agents as iron, alumina, and magnesium compounds, in soluble form.

I am aware that it has been proposed to add chlorine to sewage for de-odorizing and sterilizing, but the present invention differs from such elemental procedure in providing highly advantageous sequential operations of de-odorizing, effecting coagulation and settling, with promotion thereof by addition of suitable agents and recycled sludge, and further final sterilization of the effluent and the concentrated sludge respectively. An easily operated procedure, sufficiently flexible to meet requirements of varying materials, is had, with relatively inexpensive outlay, and without requirement of an undue amount of highly technical supervision.

Other modes of applying the principle of the invention may be employed, change being made as regards the details described, provided the features stated in any of the following claims, or the equivalent of such, be employed.

I therefore particularly point out and distinctly claim as my invention:—

1. A process of the character described, which comprises preliminarily de-odorizing by admixing chlorine in amount insufficient to sterilize, admixing lime, slowly agitating, coagulating, separating into solids and effluent, and separately sterilizing the solids for disposal.

2. A process of the character described, which comprises preliminarily de-odorizing by admixing chlorine in amount insufficient to sterilize, admixing lime, slowly agitating, coagulating, separating into solids and effluent, returning a portion of the solids to the coagulating zone, and separately sterilizing the solids for disposal.

3. A process of the character described, which comprises preliminarily de-odorizing by admixing chlorine in amount insufficient to sterilize, admixing lime, slowly agitating, coagulating, separating into solids and effluent, returning a portion of solids to the coagulating zone, separately sterilizing the effluent, and admixing chlorine with the solids for disposal.

4. A process of the character described, which comprises de-odorizing by admixing about 10–20 parts per million of chlorine, admixing lime, slowly agitating, separating into solids and effluent, sterilizing the effluent by admixing chlorine, and separately sterilizing the solids for disposal by admixing chlorine.

5. A process of the character described, which comprises de-odorizing by admixing about 10–20 parts per million of chlorine, admixing lime, slowly agitating, separating into solids and effluent, sterilizing the effluent by admixing chlorine, returning a portion of the solids to the in-coming sewage, and separately sterilizing the solids for disposal.

6. A process of the character described, which comprises de-odorizing by admixing about 10–20 parts per million of chlorine, admixing lime, slowly agitating, separating into solids and effluent, sterilizing the effluent by admixing chlorine, returning a portion of the solids to the incoming material, sterilizing the solids by admixing chlorine, and pulping the other portion and sheeting it into paper-form.

CLIFTON N. WINDECKER.